United States Patent
Regusewicz

(10) Patent No.: US 10,695,829 B2
(45) Date of Patent: Jun. 30, 2020

(54) MAINTENANCE STATION FOR CASTING MOLDS AND MAINTENANCE METHOD FOR A CASTING MOLD

(71) Applicant: Bayerische Motoren Werke Aktiengesellschaft, Munich (DE)

(72) Inventor: Franz Regusewicz, Shenyang (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 235 days.

(21) Appl. No.: 15/154,334

(22) Filed: May 13, 2016

(65) Prior Publication Data

US 2016/0256924 A1    Sep. 8, 2016

Related U.S. Application Data

(63) Continuation of application No. PCT/EP2014/073175, filed on Oct. 29, 2014.

(30) Foreign Application Priority Data

Nov. 15, 2013   (DE) ........................ 10 2013 223 311

(51) Int. Cl.
| | |
|---|---|
| *B22D 43/00* | (2006.01) |
| *B22D 33/00* | (2006.01) |
| *B22C 23/02* | (2006.01) |
| *B24C 1/08* | (2006.01) |
| *B24C 3/32* | (2006.01) |

(Continued)

(52) U.S. Cl.
CPC .............. *B22D 43/00* (2013.01); *B22C 23/00* (2013.01); *B22C 23/02* (2013.01); *B22D 33/00* (2013.01); *B24C 1/003* (2013.01); *B24C 1/086* (2013.01); *B24C 3/04* (2013.01); *B24C 3/32* (2013.01); *B29C 33/72* (2013.01); *B29C 33/722* (2013.01)

(58) Field of Classification Search
CPC ......... B22C 23/00; B22C 23/02; B22D 33/00; B22D 43/00; B24C 1/003; B24C 1/08; B24C 1/086; B24C 3/04; B24C 3/32
USPC .................................................. 164/158, 267
See application file for complete search history.

(56) References Cited

U.S. PATENT DOCUMENTS

| | | | |
|---|---|---|---|
| 5,937,931 | A | 8/1999 | Haessig |
| 6,220,334 | B1 | 4/2001 | Tomita et al. |

(Continued)

FOREIGN PATENT DOCUMENTS

| | | |
|---|---|---|
| AT | 271761 B | 6/1969 |
| CN | 1180597 A | 5/1998 |

(Continued)

OTHER PUBLICATIONS

International Search Report (PCT/ISA/210) issued in PCT Application PCT/EP2014/073175 dated Jan. 28, 2015, with English translation (six (6) pages).

(Continued)

*Primary Examiner* — Kevin P Kerns
(74) *Attorney, Agent, or Firm* — Crowell & Moring LLP

(57) ABSTRACT

A maintenance station for casting molds is provided with a handling device on which a spraying device is disposed. The spraying device sprays a cleaning medium onto a surface of at least one casting mold. The cleaning medium is a mixture of compressed air and abrasive particles. A maintenance method for the casting mold in the maintenance station is also provided.

3 Claims, 1 Drawing Sheet

(51) Int. Cl.
*B24C 3/04* (2006.01)
*B22C 23/00* (2006.01)
*B29C 33/72* (2006.01)
*B24C 1/00* (2006.01)

(56) References Cited

U.S. PATENT DOCUMENTS

| | | | |
|---|---|---|---|
| 6,857,463 | B1 | 2/2005 | Jordan et al. |
| 6,902,758 | B2 | 6/2005 | Donatti et al. |
| 8,220,523 | B2 | 7/2012 | Morgott et al. |
| 2002/0153118 | A1* | 10/2002 | Roche et al. ........ B22D 23/003 164/46 |

FOREIGN PATENT DOCUMENTS

| | | |
|---|---|---|
| CN | 201511108 U | 6/2010 |
| CN | 203209671 U | 9/2013 |
| DE | 92 04 120 U1 | 7/1992 |
| DE | 698 07 628 T2 | 2/2003 |
| DE | 103 07 559 B4 | 10/2007 |
| DE | 10 2009 009 559 A1 | 8/2010 |
| DE | 20 2013 001 422 U1 | 6/2013 |
| EP | 0 190 340 B1 | 6/1990 |
| EP | 0 824 983 A1 | 2/1998 |
| EP | 1 702 717 A1 | 9/2006 |
| GB | 1195292 | 6/1970 |
| JP | 63-137542 A | 6/1988 |
| JP | 2009-28751 A | 2/2009 |
| KR | 10-2013-0120131 A | 11/2013 |
| WO | WO 2004/058434 A1 | 7/2004 |
| WO | WO 2007/099142 A1 | 9/2007 |

OTHER PUBLICATIONS

German Search Report issued in counterpart German Application No. 10 2013 223 311.6 dated Jul. 23, 2014, with partial English translation (fifteen (15) pages).

Chinese-language Office Action issued in counterpart Chinese Application No. 201480052204.8 dated Oct. 9, 2016 with English translation (Fifteen (15) pages).

* cited by examiner

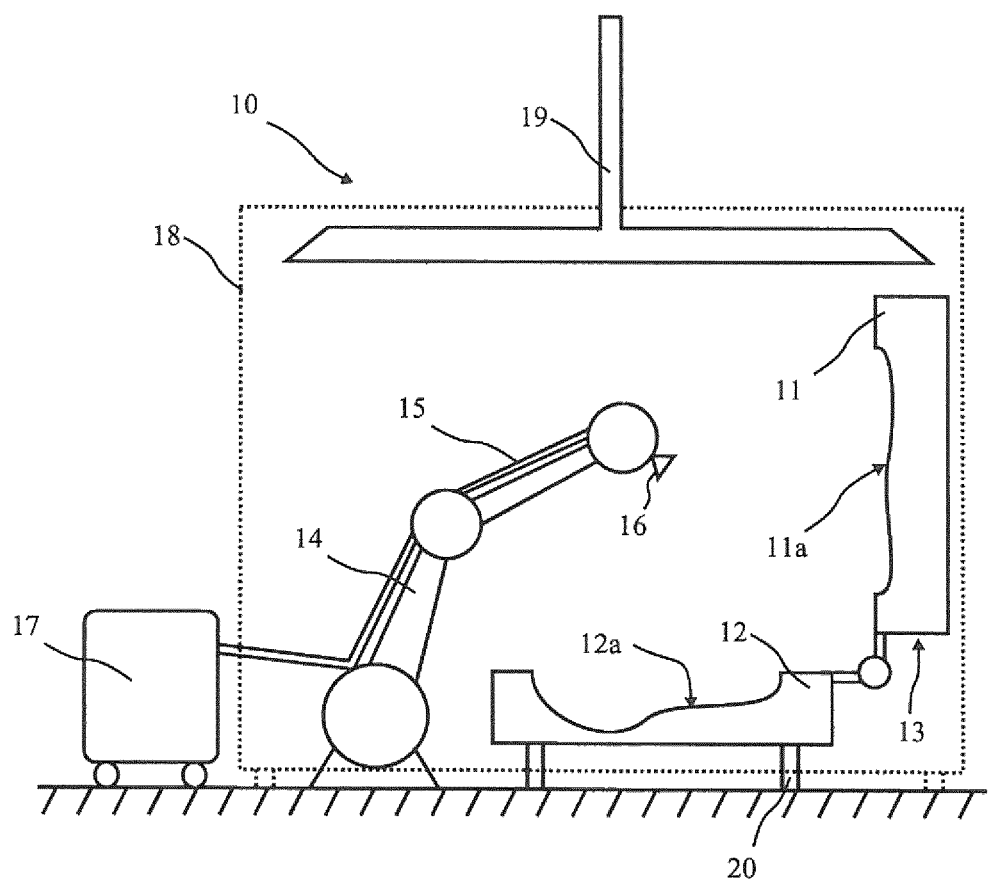

MAINTENANCE STATION FOR CASTING MOLDS AND MAINTENANCE METHOD FOR A CASTING MOLD

CROSS REFERENCE TO RELATED APPLICATIONS

This application is a continuation of PCT International Application No. PCT/EP2014/073175, filed Oct. 29, 2014, which claims priority under 35 U.S.C. § 119 from German Patent Application No. 10 2013 223 311.6, filed Nov. 15, 2013, the entire disclosures of which are herein expressly incorporated by reference.

BACKGROUND AND SUMMARY OF THE INVENTION

The invention relates to a maintenance station for casting molds and to a method for maintaining a casting mold.

So-called casting molds are used as casting tools in the manufacturing of cast components. These casting molds may be constructed from multiple parts, for example in the form of two parts, from a lower mold half and an upper mold half. A liquid molten metal is introduced into the casting mold, the former hardening and in the solidified state forming the cast component or a precursor to the cast component, that is to say a so-called semi-finished product. Once the cast component has at least partially hardened in order to have sufficient dimensional stability, it may be removed from the casting mold. On account of the individual casting procedures, deposits are formed over time on the shape-imparting surfaces of the molds, that is to say on the mold surface which is in contact with the pourable metal. Furthermore, a coating which is subject to wear on account of the repeated casting procedures is provided on the shape-imparting surface of the molds.

The dimensional accuracy of the components which are manufactured using the molding tool is reduced by the formation of deposits as well as by the wear of the coating, on account of which quality is compromised. There beyond, there is also an influence pertaining to the process on account of the wear phenomena on the mold.

In the prior art to date the mold is manually cleaned in the casting area. After cleaning, the tool surface is provided with a facing and a new coating is thus applied. Since cleaning and coating take place directly in the casting area, the mold has a temperature in the range of approx. 350° C. This results in high thermal stress for the cleaning personnel. Moreover, the cleaning may result in removed facing residue in the form of dust that may be inhaled by the operator. Not least, an interruption in production is created on account of cleaning and coating the mold in the casting area.

Proceeding from this prior art, the present invention is based on the object of providing a maintenance station and a simplified method for mold maintenance by way of which the disadvantages of the prior art are overcome. It is furthermore an object of the invention to provide such a maintenance station or a method for maintaining casting molds, respectively, which to the largest extent may be independently implemented.

This and other objects are achieved by a method for maintaining a casting mold, along with a maintenance station to perform the method, in accordance with embodiments of the invention.

According to an aspect of the invention, a maintenance station is provided for casting molds, having a handling device on which a spraying device is disposed, wherein by way of the spraying device a cleaning medium is sprayed or blasted onto a surface of at least one casting mold, wherein the cleaning medium is a mixture of compressed air and abrasive particles.

The abrasive particles may be configured in particular as ice particles, sand grains, and/or salt grains.

The handling device may furthermore be configured as a robot. By way of this construction, the tool surface of the casting mold may be cleaned in a particularly simple manner.

Additionally, a blasting apparatus in which the cleaning medium is stored may be provided. The cleaning medium, by way of a supply installation, may be connected to the spraying device.

Furthermore, a coating device, by way of which a coating is capable of being applied to the surface of the casting mold, may be provided.

In a first embodiment, the coating device is provided on the handling device on which the spraying device is also disposed. Alternatively, in a second embodiment the coating device is disposed on a separate handling device.

Additionally, a noise protection device may be provided on the maintenance station. On account thereof, noise emissions are reduced, and occupational safety and occupational ergonomics are improved.

Additionally or alternatively, a suction device may be provided for suctioning the deposit residue which is raised during cleaning. On account thereof, it may be prevented that this dust settles in the environment of the cleaning station or is inhaled by an operator, respectively.

In a further aspect, the invention relates to a method for maintaining a casting mold by way of an above-described maintenance station, the method comprising the following steps: removing the casting mold from the casting area; transferring the casting mold to the maintenance station; removing casting residue which is located on the surface of the casting mold by blasting or spraying the surface using a cleaning medium; applying a coating to the mold surface; and transferring the casting mold to the casting area. On account thereof, the casting mold may be maintained in a maintenance space and thus not directly in the casting area, so that maintenance personnel are not exposed to a high temperatures as is the case in the prior art.

Additionally, after removal of a first casting mold from the casting area, a second maintained casting mold may be introduced into the casting area. This offers the advantage that production may immediately continue in the casting area, so that production down time is reduced to a minimum.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram illustrating the in-principle construction of a maintenance station for casting molds, according to an embodiment of the present invention.

DETAILED DESCRIPTION OF THE DRAWING

A maintenance station 10 for casting molds 13 is schematically illustrated in FIG. 1. The casting mold 13 is constructed in two parts, having an upper mold 11 and a lower mold 12. These mold halves 11, 12 are pivotably or rotatably connected, so that the mold 13 is convertible to an open position and to a closed position. FIG. 1 shows an open position. In the closed position, the mold halves 11, 12 configure a cavity into which casting material is poured to be cast. The inner mold surfaces 11a or 12a, respectively, then form the tool surfaces for the component to be manufactured.

The casting mold 13 is removed from the casting area and is moved into the maintenance station 10, as is illustrated in FIG. 1. The casting mold 13 here is aligned so as to be in a predetermined position in relation to a handling device 14, for example to a robot. To this end, positioning aids, for example stop elements, or latching recesses into which the casting mold 13 latches in relation to a factory floor, may be provided. Alternatively, support beams 20 which receive the casting mold 13 and thus align the latter in a predetermined manner in relation to the robot 14 may be provided.

A spraying device 16 is provided on the robot 14. The spraying device 16, by way of a supply device 15, is connected to a blasting apparatus 17. The blasting apparatus 17 includes a reservoir in which abrasive particles, in particular ice, salt grains, and/or sand grains are stored. The particles by way of the supply device, for example a supply line 15, are supplied to the spraying device 16. The cleaning medium, that is to say the compressed air which is mixed with the abrasive particulates, is sprayed from the spraying device 16 onto the tool surfaces 11a, 11b of the casting mold 13. On account thereof, the two mold halves 11, 12 are blasted with the cleaning medium and relieved of deposits and coating residue, respectively. To this end, the handling device 14 automatically runs the spray head 16 over the tool surfaces 11a, 12a, so that the tool surfaces in terms of residue or coatings, respectively, are completely cleaned. The blasting pressure at which the cleaning medium is blasted onto the tool surfaces 11a, 12a is between 4 and 8 bar, preferably 6 bar.

On account of the precise positioning of the casting mold 13 in relation to the handling robot 14, the handling robot 14 or a controller unit or regulator unit, respectively, which is connected to the robot 14, may be instructed once for each casting mold 13. To this end, the robot 14 is manually guided by the workshop personnel, and a first mold of any type is cleaned. The motion path of the spraying device 16 which is performed here is memorized and stored. Subsequent casting molds 13 of the same type are then automatically cleaned by the robot 14.

Subsequently, a new facing is applied to the tool surfaces 11a, 12a. This facing may be a ceramic coating, for example. To this end, a coating device (not illustrated in FIG. 1) may be provided on the robot 14. The robot guides this coating device over the tool faces 11a, 12a, so as to provide the latter with a ceramic coating. After the tool surfaces 11a, 12a have been completely coated, the maintenance procedure on the casting mold is terminated. The casting mold 13 may be removed from the maintenance station 10 and moved back to the casting area.

Noise protection 18 that insulates against sound may be provided on the maintenance station 10. This noise protection 18 may be configured from noise protection walls which are disposed around the handling device 14 and the casting mold 13, for example. The noise protection 18 toward the top may be open or else closed.

Furthermore, a suction device 19 which, in an exemplary manner, is disposed in the upper region of the maintenance station 10 is provided in FIG. 1. Alternatively, the suction device 19 may also be disposed laterally. The dust which is created during cleaning is suctioned away by way of the suction device 19. In a further and alternative embodiment, suctioning may be provided directly on the handling device 14. On account thereof, raised dust having coating residue may be trapped and suctioned directly on the surface of the mold 13.

The advantages of the invention are to be briefly summarized hereunder. The work load of personnel is reduced and unnecessary contamination in the casting area is prevented on account of automatic cleaning of the casting molds with the aid of a handling unit. There beyond, automatic maintenance by means of a robot offers precisely repeated cleaning and coating of the mold. Not least, this invention offers the advantage that a plurality of castings may be delivered per unit of time, since use of the casting area is interrupted for only a brief period.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A maintenance system for a casting mold, comprising:
a handling device;
a spraying device disposed on the handling device, wherein
    the spraying device is configured to spray a cleaning medium onto a surface of a casting mold to be cleaned,
    the cleaning medium is a mixture of compressed air and abrasive particles,
    the abrasive particles comprise one or more of ice particles, grains of sand, and grains of salt,
    the handling device is a robot with which the spray device is configured to be automatically driveable over the surface of the casting mold;
a blasting apparatus in which the cleaning medium is stored;
a supply device configured to connect the blasting apparatus to the spraying device; and
a coating device that is configured to apply a ceramic coating to the surface of the casting mold, the ceramic coating being different in composition from the cleaning medium stored in the blasting apparatus, wherein
    the coating device is provided: i) on the handling device on which the spraying device is disposed, or ii) on a separate handling device.

2. The maintenance system according to claim 1, further comprising a noise protection installation configured for the maintenance station.

3. The maintenance system according to claim 1, further comprising a suction device.

* * * * *